United States Patent [19]

Bussmann et al.

[11] 4,055,751
[45] Oct. 25, 1977

[54] PROCESS CONTROL SYSTEM FOR THE AUTOMATIC ANALYSIS AND REGENERATION OF GALVANIC BATHS

[75] Inventors: Egon Bussmann, Munich; Bruno Flamme, Neuried, both of Germany; Jacky Vanhumbeeck; Johannes Helder, both of Brugge, Belgium; Hubert De Steur, Drongen, Belgium

[73] Assignee: Siemens Aktiengesellschaft, Berlin & Munich, Germany

[21] Appl. No.: 685,804

[22] Filed: May 12, 1976

[30] Foreign Application Priority Data

May 13, 1975 Germany .............................. 2521282

[51] Int. Cl.² .................... G01N 27/00; G06F 15/46
[52] U.S. Cl. .............................. 364/500; 23/253 A; 204/195 R
[58] Field of Search ........... 235/151.12, 151.3, 151.34, 235/151.35; 23/230 R, 230 A, 252 R, 253 R, 253 A; 204/195 R; 427/8, 58, 82, 96, 123–126; 29/DIG. 12; 148/4, 6, 6.14 R, 1.5; 444/1

[56] References Cited

U.S. PATENT DOCUMENTS

| | | | |
|---|---|---|---|
| 3,497,449 | 2/1970 | Urban | 23/230 A X |
| 3,643,076 | 2/1972 | Bell et al. | 235/151.34 X |
| 3,654,113 | 4/1972 | Bochinski | 23/230 R X |
| 3,690,833 | 9/1972 | Ferarri | 23/230 A X |
| 3,719,565 | 3/1973 | Herrmann | 204/195 R X |

Primary Examiner—Joseph F. Ruggiero
Attorney, Agent, or Firm—Hill, Gross, Simpson, Van Santen, Steadman, Chiara & Simpson

[57] ABSTRACT

A process control system for metal depositing baths for monitoring the chemical composition of a bath liquid provides that, in the event of a deviation of a component of the bath liquid from a reference value, the bath liquid is regenerated by supplying correcting liquid to the bath. The system includes an automatically operating analyzer which is connected to a measured value adjusting device which, in dependence upon the difference established between a reference value and an actual value of the bath liquid component subject to analysis, controls the supply of the correcting liquid to the bath. A common process control system for a plurality of galvanic baths includes a main programmer, a bath selection programmer and analysis programmers which can be selectively connected by the selection programmer, and which in accordance with the individual components of the bath liquid which is to be analyzed, actuate specific analyzer sections of the analyzer where each measured value adjusting device which is connected to an analyzer section will, in the case of a difference in measured value, control the supply of the correct quantity of the specific correcting liquid to the particular bath which is subject to analysis.

14 Claims, 6 Drawing Figures

PROCESS CONTROL SYSTEM FOR THE AUTOMATIC ANALYSIS AND REGENERATION OF GALVANIC BATHS

BACKGROUND OF THE INVENTION

1. Field of the Invention

The present invention relates to a process control system for metal-depositing baths, which system serves to monitor the chemical composition of a bath liquid and which, in the event of deviations of individual components of the bath liquid from a theoretical value, regenerates the bath liquid by supplying correcting liquid to the bath, and more particularly to such a system which comprises an automatically operating analyzer which is connected to a measured value adjusting device which, in dependence upon the established difference between a "reference" value and an "actual" value of the bath liquid component which is subject to analysis, controls the supply of the correcting liquid to the bath.

2. Description of the Prior Art

In order to carry out titration, or to determine the chemical state of a galvanic bath, and in order to regenerate the bath liquid of a galvanic bath, it is known in the art to automatically withdraw a given quantity of liquid from the bath at predetermined times within a cycle. This is effected with the aid of a process control system containing a clock. This quantity is supplied with a reagent in portions and automatically. The time taken until the point of change occurs is represented as an "actual" section value and is compared with a "reference" section value. The difference established between these section values is a control value which governs the automatic supply of correcting liquid to the bath.

Fully automatically operating analysis devices are also well known in the art. In such devices, the samples which are to be analyzed are mixed by means of suitable diluting and/or reaction agents and are subsequently colorimetrically measured. The analyzer is set up in such a manner that following the analysis of a specimen, its flow supply lines are cleansed and automatically dried before the analysis of the next sample is initiated. A process control unit, e.g. a program card or a program tape, governs the function and the control of the analyzer automatically. For example, water, methanol or acetic acid is used to cleanse the analyzer. The analyzer is set up in such a manner that the liquid which is to be analyzed can be analyzed into a plurality of components, i.e. in its constituents.

Also known is a control device which automatically maintains constant the composition of an electrolytic bath and by means of which the additives to the electrolyte in the bath are effected in the correct quantities under the control of a pump. In dependence upon the quantity of electricity flowing in the electrolytic bath, correcting liquid is supplied to the bath at predetermined times by means of an adjustable number of piston strokes.

The previously known processes, process control units and devices serving to maintain constant the chemical composition of the liquid in galvanic baths, served the function of monitoring and analyzing the bath liquid of a specific galvanic bath, and in dependence upon the result of the analysis and also in dependence upon the particular current load of the bath, of adding a specific quantity of the relevant correcting liquid to the bath for its regeneration. If, for example, a plurality of galvanic baths of different types are involved in one plant, e.g. baths for coating electric components with noble metals, with copper and/or for the contour etching of components, i.e. galvanic baths whose bath liquids have differing chemical compositions, it is necessary to provide special analysis devices for these baths. The analysis and possibly also the regeneration of a galvanic gold bath is of particular importance, as these baths also contain so-called alloy metals which impart special mechanical properties to the gold layer. The analysis of cyanide gold baths, which in addition to quantities of alloys, also contain buffer substances and possibly also organic additives, is extremely expensive. To establish the gold in potassium aurocyanide, a photo-metric process is employed, utilizing a commercially available reagent (astra-violet). The analysis must extend to all of the basic bath components, and therefore is also time consuming. In such baths, the gold content generally amounts of 9 to 10 g/l, but can also be less, and, for example, amount to only 1 g/l. However, when such a bath is in a plant, the gold content can only be maintained constant with great difficulty, because of the long duration of the analysis process which, in the case of these baths, has previously been carried out only manually, and because of the additional time required to regenerate the individual baths. Therefore, considerable deviations from the reference value of the gold content cannot be ruled out. Too high or too low of a gold content affects the thickness of the produced coating layers and also indirectly affects the consumption of noble metal and the quality of the coating layer. Therefore, in order to adhere to the theoretical or reference value, it is necessary to repeat the analysis of such baths at intervals which occur as frequently as possible. If a plurality of similar to unsimilar baths are involved, as described above, in galvanic plants it is desirable that the monitoring of the individual baths should take place with the least possible number of personnel, and also with a low technical expense.

SUMMARY OF THE INVENTION

Therefore, the object of the present invention is to provide a process control system for the automatic analysis of a plurality of galvanic and/or metal depositing baths, by means of which it is possible, in comparatively short intervals of time, to carry out an automatic, high-accuracy analysis of the bath liquid contained in a selected bath, in particular in the case of gold baths, in respect of the various liquid components, and, where necessary, in dependence upon the result of the analysis, to regenerate the selected, analyzed bath, likewise automatically, by the supply of correcting liquid.

According to the invention, the process control system is to be designed in such a manner that, serving as a central unit for a plurality of galvanic baths, the process control system fulfills the function of an analyzer, a reference value and actual value adjusting device, and, again as a central unit, controls the supply of correcting liquid to the bath which is subject to analysis.

A futher object of the invention is to provide a process control system of the type described above, in a plant comprising a plurality of galvanic baths, to monitor the function of the individual baths, to record the analysis result and to determine the sequence in which the individual baths are to be subject to analysis.

Beginning with a process control system of the type generally described in the introductory portion of the specification, the invention provides that a plurality of galvanic baths are connected to a common process control system which is provided with a bath selection programmer and analysis programmers which can be selectively connected by the bath selection programmer and which, in accordance with the individual components of the bath liquid which is to be analyzed, operates specific analyzer sections of the analyzer, wherein the case of a measured value difference, each measured value adjusting device which is connected to an analysis section controls the supply of the specific correcting liquid to the bath which is subject to analysis.

According to the present invention, the process control system enables a plurality of galvanic baths to be monitored and controlled by a common process control system. The particular advantage of this approach consists in that particularly critical baths in particular gold baths, can now be monitored without a high outlay in time and personnel, and the consumption of noble metal can now be kept within optimum limits. A process control system of this type is extensive and also expensive; the high expense required for setting up the analysis-monitoring-and control unit is justified in the reduction in the labor time of highly qualified technical staff, and in an improvement in the products in the form of a uniformly good quality. The process control system advantageously also serves to monitor the pre-treatment baths which precede the noble metal baths in the production cycle. The reject quota of finished components, e.g. due to shortcomings when the work piece passes through a unmonitored bath within the production cycle, can thus be substantially reduced.

In the production of plating layers on electric components, various baths are used, and these baths generally exhibit different functions (flushing baths, etching baths, metal application baths for the production of a first coating layer, a second coating layer consisting of a different metal and the like). A few baths become "consumed" rapidly, whereas other baths are less critical. Therefore, the program of the bath selection programmer is contrived to be such that critical baths are subjected to more frequent analysis than other baths. In dependence upon the bath which is to be analyzed, and possibly regenerated, the bath selection programmer calls up an analysis programmer assigned to this bath, which programmer is contained in the process control system and which now actuates the successive functions required for the execution of the analysis. The analyzer processes a number of "analysis sections", namely for each bath component to be analyzed (e.g. first bath, metal content gold, metal content chrome, pH value; second bath; copper, pH value, etc). Therefore, the analyzer consists of a number of individual analyzers corresponding to the number of different bath components, namely the analysis sections. Each of these analysis sections is connected to a measured value adjusting device which, in a known manner, compares a given theoretical reference value with the actual value determined by the analyzer. The analysis section forms the difference between these values and feeds the established difference signal, e.g. in the form of an analog value, to an adjusting computer which controls the valves or pumps which supply the specific correcting liquid to the bath which is subject to analysis. Thus, the analysis programmer is assigned to a specific bath, in respect of which it controls and terminates the analysis process.

In order to avoid mis-analyses, as already described, in automatic analyzers it is known to automatically flush the pipe lines and cuvettes following each analysis. Following each analysis, the bath selection programmer or the analysis programmer actuates a flushing programmer whose function is to supply flushing liquid to the previously operated analysis sections of the analyzer.

Often a galvanic plant comprises a plurality of baths which, although similar in respect of their bath liquid, differ from one another in respect of their volume. Therefore, the liquid of these baths is analyzed in the same analysis sections of the analyzer. Should, for example two actual values of identical components of various similar baths differ from the common reference value, it is however necessary to supply the bath having the larger volume with a larger quantity of correcting liquid. For this purpose, in accordance with another feature of the invention, the measured value adjusting devices are connected to an adjustment setting device which can be connected by the bath selection programmer to the measured value adjusting device, the adjustment setting device serving to multiply the established difference value with a proportional factor corresponding to the size of the bath. This results in the fact that the supply valve which serves to supply the specific correcting liquid to the larger bath remains open for a comparatively longer length of time. It is also possible that in the case of a plurality of baths, for example two baths, whose bath liquids are alike in respect of chemical composition, the components may differ in magnitude, i.e. the reference values may differ. Therefore, although the same analysis sections of the analyzer are employed to analyze such baths, the reference value of the two bath liquids differ, and it is therefore provided that the measured value adjusting devices which serve to establish the difference between the reference value and the actual value obtain the relevant reference value; therefore, the measured value adjusting devices are assigned reference value generators, the assignment of one of the reference value generators to the measured value adjusting devices being controlled by the bath selection programmer.

The process control unit also includes a plurality of measured value registers and/or measured value data stores, the number of which corresponds at least to the number of baths monitored by the process control system. The measured value registers and/or stores are connected to the measured value adjusting devices; they are connected by the bath selection programmer to the measured value adjusting devices in such a manner that in the analysis of one bath selected from a number of others, the measured value register and/or store assigned to this bath is in operation. Registers and data stores of this type are known per se for control systems which serve to conduct the work pieces to the galvanic baths. The process control system designed in accordance with the present invention can also be used to control the work piece flow in galvanic plants by virtue of the interposition of additional, known process control units.

BRIEF DESCRIPTION OF THE DRAWING

Other objects, features and advantages of the invention, its organization, construction and operation will be best understood from the following detailed description taken in conjunction with the accompanying drawings, on which.

As indicated above, the drawing schematically illustrate a process control system designed in accordance with the present invention. In order to clarify the drawing and to better illustrate the invention, the explicit representation of individual electronic function circuits and modules generally known per se, and operating elements, has been omitted.

DESCRIPTION OF THE PREFERRED EMBODIMENTS

Figure 1:
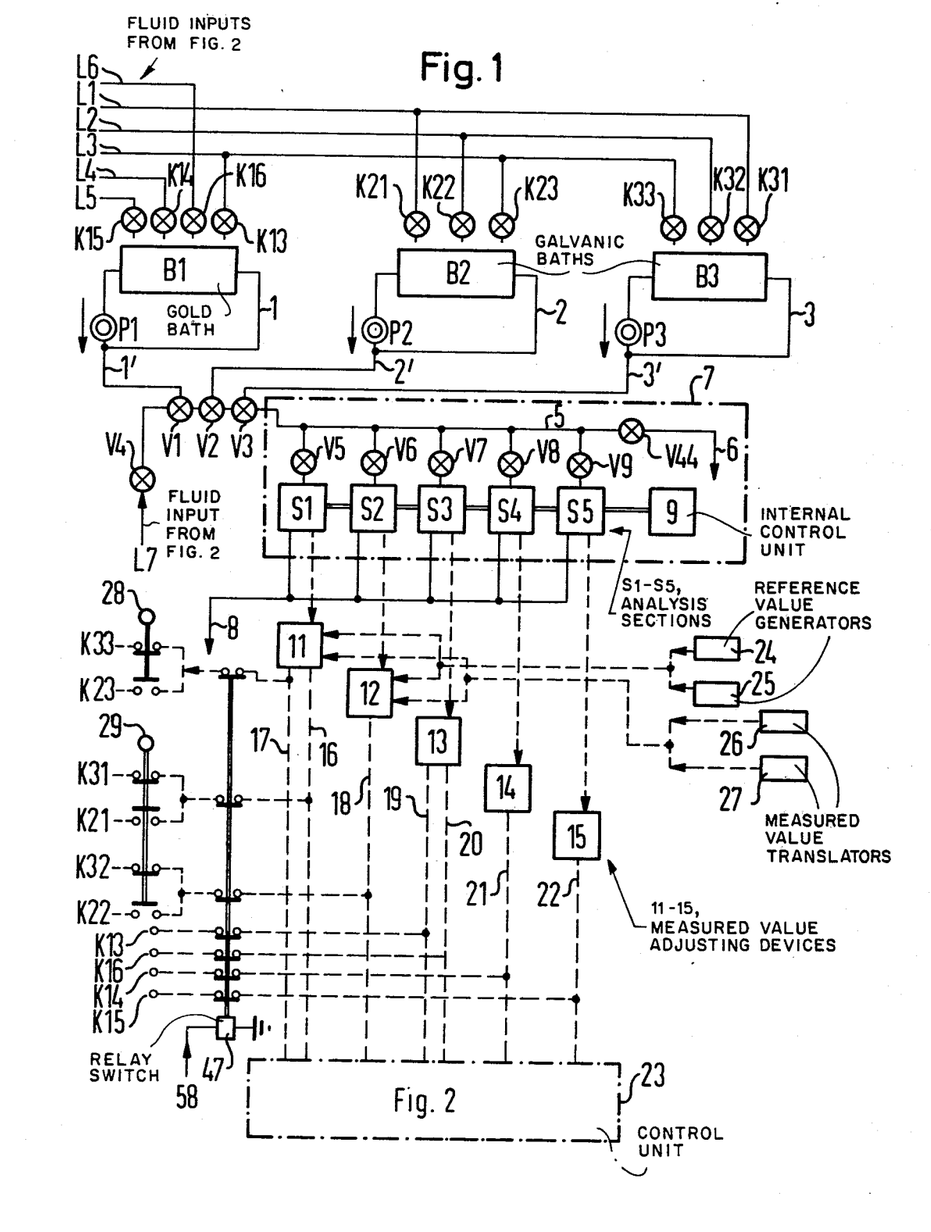
FIGS. 1 and 2 schematically illustrate a process control system constructed in accordance with the present invention and in which FIG. 1 specifically illustrates an analzyer having measured value adjusting devices and FIG. 2 illustrates that part of the process control system which relates to the central control unit and consists of the bath selection programmer and the analysis programmers together with a register.
Figure 2:
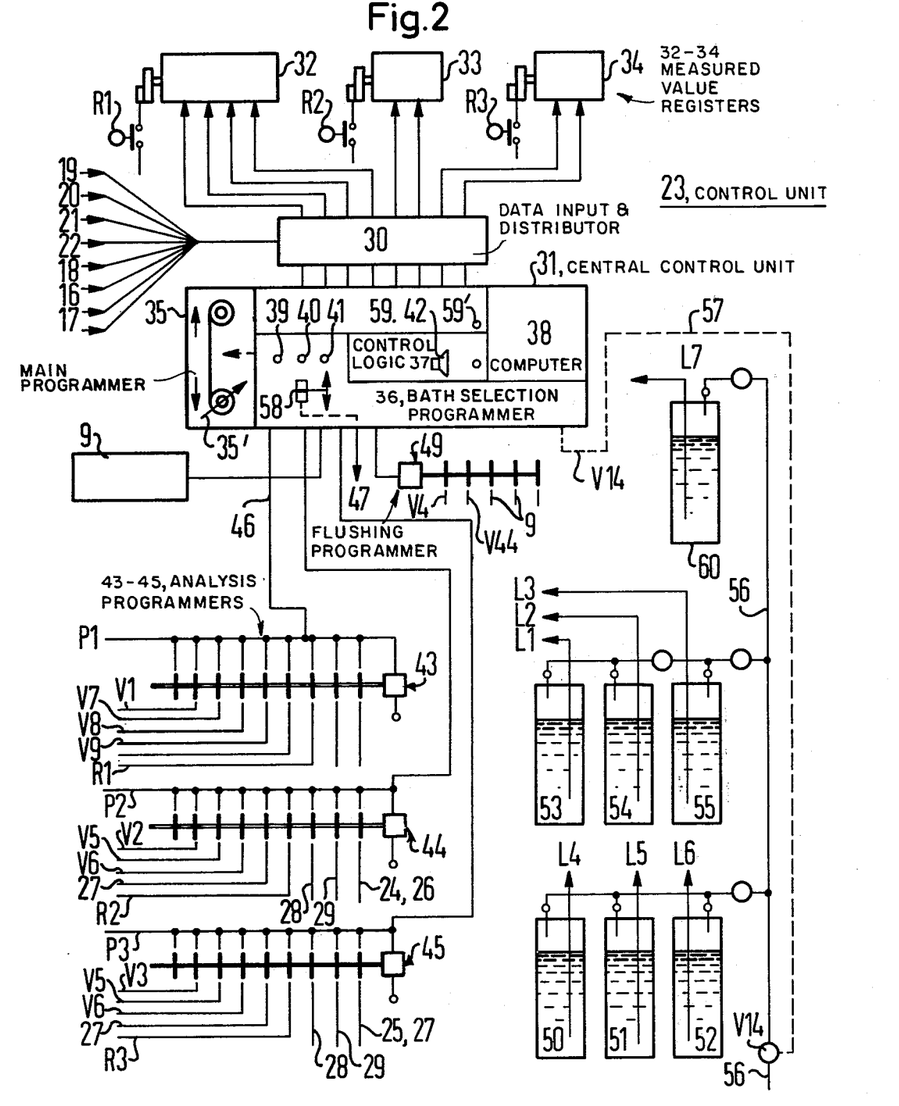

Referring to FIGS. 1 and 2, a process control system is illustrated in which, FIG. 1 shows the analyzer with the measured value adjusting devices, whereas FIG. 2 illustrates that part of the process control system which relates to the central control unit, consisting of the bath selection programmer and the analysis programmers together with a register.

In FIG. 1, metal-depositing baths are referenced B1-B3, where bath B1 is a gold bath and baths B2 and B3 are two galvanic baths having different volumes and which are similar in respect of the composition of the bath liquid the different terms of the size of the individual components of the bath liquid. Each bath possesses a circulating pipe line 1, 2 and 3, each having a pump P1-P3, respectively, which when switched on causes the relevant bath liquid to circulate. Each circulating line can be connected by means of a valve V1-V3, respectively by way of a respective branch line 1', 2' and 3' to a common supply line 5 of an analyzer 7. The connection line has a blocking valve V4 and a further blocking valve V44. The line branch 5 is connected by way of the valve V4 to the common flushing line L7 and is connected to the analyzer 7 (here framed in a dot-dash broken line). The valves V1, V2 and V3 are constructed in the form of slide valves, so that when in the closed position in respect of the branch lines 1'-3' they switch the line branch L7 into fluid communication with the line 5. The analyzer includes a plurality of analysis sections S1-S5. The analysis section S1 serves to determine the pH value, e.g. of the liquids contained in the baths B2 and B3, the section S2 serves to analyze the copper content of the baths B2 and B3, the section S3 serves to determine the pH value of the gold bath, the section S4 serves to determine, for example, the cobalt content, and the analysis section S5 serves to determine the gold content of the gold bath B1. Each analysis section is connected by means of a valve V5-V9 to the branch line 5. The bath liquids of the baths B1, B2, B3 . . . etc are constantly recycled by means of the pumps P1, P2, P3 . . . etc. If, for example, the bath liquid of the gold bath B1 is to be analyzed, the valves V1 and V7 to V9 are opened, whereas all of the other valves remain closed. The bath liquids flowing out of the analysis sections pass across one (or various) discharge lines 8 into a collector vessel or vessels (not illustrated). It does without saying that the individual liquids, e.g. those from the sections S3-S5, are specially collected in order to regain the gold or noble metal contained in the bath liquid. The automatic analyzer 7 is operated with a special internal control unit 9. After each analysis, the analysis sections which have been in operation and the common connection lines are flushed out. Here, the valves V1-V3 are set so as to provide that the pipe line 5 is connected in fluid communication so that all of the branch lines 1'-3' are closed. The valves V4 and V44 are opened so that the flushing liquid flows from the pipe line L7 in the direction of the arrow through the pipe line 5 and flushes the latter. The flushing liquid is discharged by way of the branch line 6 and is collected. Subsequently, the valve V44 is closed, and now the valves, for example S3-S5 are opened, whereby the gold bath analysis sections are flushed out. When the other analysis sections, e.g. S2 and S1 have been used, these can also be specially flushed. The sections are flushed out by switching on the control unit 9 for the automatic analyzer. Following the flushing process all of the valves close.

The measured values determined during the analysis of the bath liquid in the sections pass, as illustrated in broken lines, to the measured value adjusting devices 11-15, which devices are known per se and compare the actual value determined by the relevant analysis section with a reference value. The difference between the reference value and the actual value is the control value which governs the supply of correcting liquid to the bath which is subject to analysis. The difference value which has been represented as a voltage value (in analog form) corresponds to a specific opening time of the relevant valve for supplying correcting liquid to the bath. In practice, correcting liquid is supplied to the baths B1-B3 through the pipe lines L1-L6 which are connected to correcting liquid containers as illustrated in FIG. 2. The measured value adjusting devices 11-15 are connected by way of the signal lines 16-22 to correcting control valves K13-K16, K21-K23 and K31-K33. The pipe lines which serve to regenerate the bath liquids, the lines L1-L6, are connected to the containers 51-55 (FIG. 2) which contain the correcting liquids. The signal lines are also connected to the central process control unit. A few of the measured value adjusting devices, here 11 and 12, are connected to reference value generators 24 and 25 and to measured value translators 26 and 27. These measured value translators 26 and 27 and reference value generators 24 and 25 can be directly connected by the bath selection programmer, generally referenced 36 in FIG. 2. It is necessary to correct the signal present at the relevant measured value adjusting devices 11 and 12, because although the two baths are similar in respect of their chemical compositions, they differ in terms of the size of the components of the bath liquids.

The measured value adjusting device 11 has two signal lines 16 and 17, as the pH value can be positive or negative in relation to the reference value. Depending upon the nature of the deviation from the reference value, it is necessary to add either an acid, or, in the other case, a diluent, e.g. distilled water, to the bath liquid. The switches 28 which are actuated by the bath selection programmer connect the line branches K33 and K23 to enable distilled water to be supplied to the bath, whereas the line branches K21 and K31 are connected by the switch 29, e.g. controlling the supply of an acid to the bath. Accordingly, the measured value adjusting device 13 which serves to determine the pH value of the gold bath also possesses two signal lines.

The construction of the control unit, generally referenced 23 in FIG. 1, is schematically illustrated in greater detail in FIG. 2. The signal lines of the measured value adjusting devices 16–22 are connected to a data input and distributor block 30. The data input block 30 is connected, on the one hand, to the central control unit 31 of the process control unit 23 and, on the other hand, to a plurality of measured value registers 32–34. The central control unit 31 comprises the programmer 35, a bath selection programmer (addresser) 36, a control logic 37 and a computer 38. The program stored for the control of the baths B1–B3 is, as known per se, stored in tape store program devices, and is able to be advanced and reversed (repetition of a program); the data read out pass into an addresser 36 which possesses manually operated keys 39–41. On the operation of one of the keys, e.g. the key 40, the bath B2 is excluded from the control process, and the analysis program is then skipped. In this case, the programmer switches over to "rapid motion". The skipping of individual analysis programs becomes necessary whenever baths must be freshly prepared or cleansed. The addresser is connected to the control logic 37 which compares the values measured by the measured value adjusting devices with an adjustable threshold value. If a control value determined by the measured value adjusting devices deviates from the threshold value, e.g. overshoots or undershoots the threshold value, on the conclusion of an actuated bath analysis, and instead of the correction of the bath liquid, the programmer 35 is stopped, and an alarm syste, e.g. an acoustic/or optical signal is triggered, as indicated by the element 42. The measured data determined by the measured value adjusting devices also pass to the consumption and correcting computer 38 which monitors the consumption of the various correcting liquids of the individual baths. In addition, the data determined by the measured value adjusting devices are recorded on the recording drums 32–34 so that the recorded values indicate the function of the individual baths over a long period of time. e.g. during one shift. The bath selection programmer 36, the addresser, switches on one of the analysis programmers 43–45 in accordance with the read-out program and under the control of the control logic 37. The analysis programmer 43 is assigned, for example, to the bath B1; the analysis programmer 44 is assigned to the bath B2; and the analysis programmer 45 is assigned to the bath B3. The analysis programmers serve to switch the valves, provided with the general reference V, and the relevant pumps, provided with the general reference P, which circulate the bath liquid. The bath selection programmer 36 also serves to call up the flushing programmer 49 which, following each analysis, executes a flushing program. In addition, the addresser is also connected to the internal control unit 9 for the operation and supply of the analyzer 7. The analyzer itself possesses an internal program. The individual correcting liquids are stored in the containers 50–55. The containers can be fed with gas under pressure so that when one of the valves V is opened, the correcting liquids are supplied through the supply lines L to the individual baths. The addresser is also connected to a signal line 57 which actuates the main supply valve V14 in the gas pressure line 56, to supply the correcting liquid containers 50–55 and 60.

The bath selection programmer 36 comprises a manual switch 58. In one position of this manual switch 58 the process control unit operates in an "idle operation"; on the running of the main program, in the programmer 35, all functions are actuated, with the exception of the supply valves K in the supply pipe lines L which serve to supply correcting liquid to the baths. an idle function check is necessary in order to check that the program control system is operating correctly, e.g. before the beginning of a shift. In this case, the program called up by the addresser is run through in its entirety. When the manual switch 58 is actuated in order to execute an idle function check, a relay switch 47 (FIG. 1) serves to interrupt all of the control signal lines leading to the valves so that the valves in the correcting liquid pipe lines L are without current, i.e. out of operation.

The individual baths which are monitored and operated by the process control system are also connected via various measuring lines, not illustrated, to the data input section 30. Thus, each bath, as is known per se, possesses a temperature sensing element, a liquid level indicator and possibly other check devices, whose measured values are subject to corresponding monitoring.

EXAMPLE

At the beginning of an operating shift, the entire system is first of all checked in respect of its operation. The switch 58 is switched to the "idle function check"; as a result of the operation of a key 59' in the data input section, the system is set in operation. When the system is set in operation, the main programmer 35 starts. As a rule, generally, the flushing programmer 49 is called up. In FIG. 1, the valves V1–V3 for the pipe line 5 are opened. The flushing programmer opens the valves V4 and V44; also the valve V14 in the gas pressure supply line for the containers 50–55 and 60 is opened. As a result of the opening of the valves, firstly the flusing liquid flows through the pipe lines L7 and 5; at 6 the flushing liquid is collected in a container (not illustrated). Following the flushing of the pipe line 5, the valves V4 and V44 close. The bath selection programmer 36 (addresser) now calls up a bath program, e.g. the bath B1. The analysis programmer 43 starts. The pump P1 is switched on and after approximately three minutes the analyzer programmer 9 is switched on. The delayed connection of the analyzer in relation to the pump and flushing of the pipe lines ensures that, on the one hand, no residues of bath liquid from a previous analysis reach the analyzer and, on the other hand, that the bath liquid subject to analysis corresponds to the actual state of the bath liquid in the bath. Now, the valve V1 opens, and likewise the valves V7, V8 and V9, so that the bath liquid flows into the analysis sections S3, S4 and S5. The analyzer now executes the analysis by means of an internal analyzer program. The measured value adjusting devices 13–15 obtain a signal, in digital or analog form, corresponding to the magnitudes of the components, measured in the sections, of the analyzed liquid. These measured values are each compared with a reference value in the measured value adjusting devices 13–15. The difference signal passes, on the one hand, via the lines 19 or 20, 21 and 22 into the input distributor 30 and from there into the data input section 59 of the process control unit 31, and, on the other hand, as respective "open signals" to the valves K13–K16 assigned to the relevant measured value adjusting devices. The analysis programmer 43 switches on the register drum 32 by closing the switch R1. As soon as one, or several, of the valves K13–K16 is/are called up by the associated measured value adjusting devices, no correcting liquid can flow to the bath as the control lines of the valves are opened and without current as a result of the opening of the switch 47. The valves therefore remain closed. The "idle program" which has been run in this manner, has the function of checking that the system is ready for operation, and of filling cuvette, tubes, pipettes and the like with liquid in the analyzer, so that errors in measurement are avoided in later analysis programs. Correspondingly, when the analysis program for the bath B1 has been dropped, the addresser 36 calls up the next analysis program, e.g. the bath B2, by switching on the analysis programmer 44. This program, and possibly a following program, is also an "idle program". Upon the completion of an idle program, the switch 58 is set at a position denoting "correcting operation", and now the normal operation of the process control system begins in the prescribed fashion, although now the valves K in the pipe lines L1–L7 are ready for operation. Thus, with each analysis program, whether there are deviations of the actual value from the reference value, correcting liquid is supplied to the particular bath being analyzed.

The individual analysis sections contain familiar devices which are well known per se, which are conventionally employed for the analysis of chemical baths. Analysis devices, such as, for example, pH measurement and regulation devices, colorimeters and the like are common commercially available apparatus and, of course, their use is dependent the type and purpose of the analysis.

Figure 3:
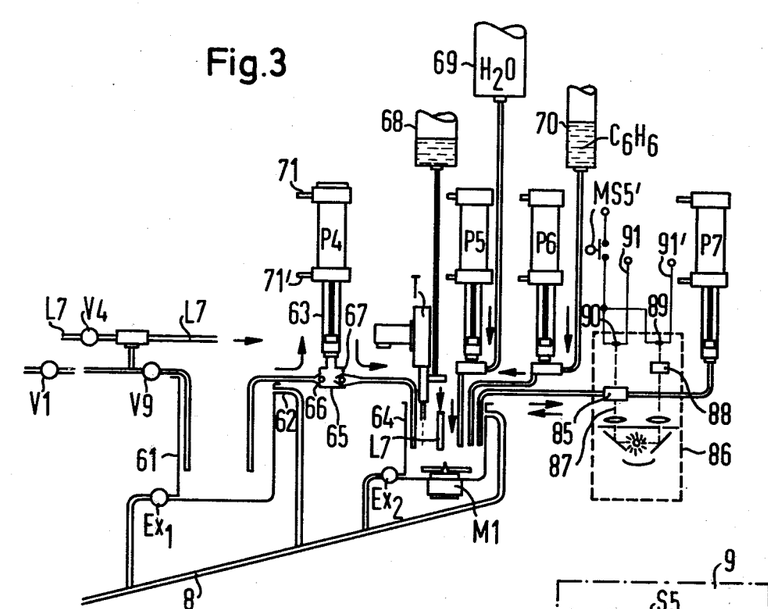
FIG. 3 is a schematic illustration of gold bath analysis apparatus.

FIG. 3 illustrates the gold bath analysis section S5 in a schematic structural form. This analysis section operates according to a known process for gold determination in pure potassium-auro-cyanide, which was disclosed by Armeanú and Baloiu (Anal. Chim. Acta 44, 1969, Pages 230.232). This is a colorimetric process using the dye additive astraviolet. After dilution of the bath with distilled water, there is formed, by the addition of astraviolet, an astraviolet-gold-cyanide complex. This is extracted by the separation of excess dye while stirring with benzene. Subsequently, the absorption of the benzene phase is measured in a colorimeter at 570 mm. The analysis section consists of a container 61 having an overflow 62, as well as of a further reaction container 64 having an overflow 64'. In its volumetric capacity the container 64 is substantially smaller than the container 61. Further, the analysis section has several metering pumps P4–P7. These are known per se and commercially available conventional metering pumps and are generally pneumatically driven. They have, for example, a control cylinder with inputs 71 and 71'. When the control input 71' is pressurized, the piston 63 can be raised, and when the control input 71 is pressurized, the piston 63 can be lowered. According to the size of the piston's volumetric capacity, a specific quantity of fluid is sucked in and, when the piston moves down, expelled. In the present example, the stroke volume of the piston 63 is connected with a check valve 65 acting in both directions. When the piston moves up, liquid is withdrawn from the container 61 and, when the piston moves down, liquid is expelled into the reaction container 64. The pump P5 is connected to a container 69 holding distilled water. During the suction stroke, the pump's piston head space fills with distilled water and when the piston descends, this quantity of distilled water is expelled into the reaction container 64. The pump P6 is connected to a container 70 containing benzene. Here, too, the method of operation is as previously described. The pump P7 transports liquid from the container 64 into its piston head space during a suction stroke and, in turn, expels this fluid into the container 64 when the piston descends. Further, a metering pump T is located above the reaction vessel 64, this pump serving to feed a precisely measured quantity of astraviolet fluid into the reaction container 64 from a container 68.

Figure 4:
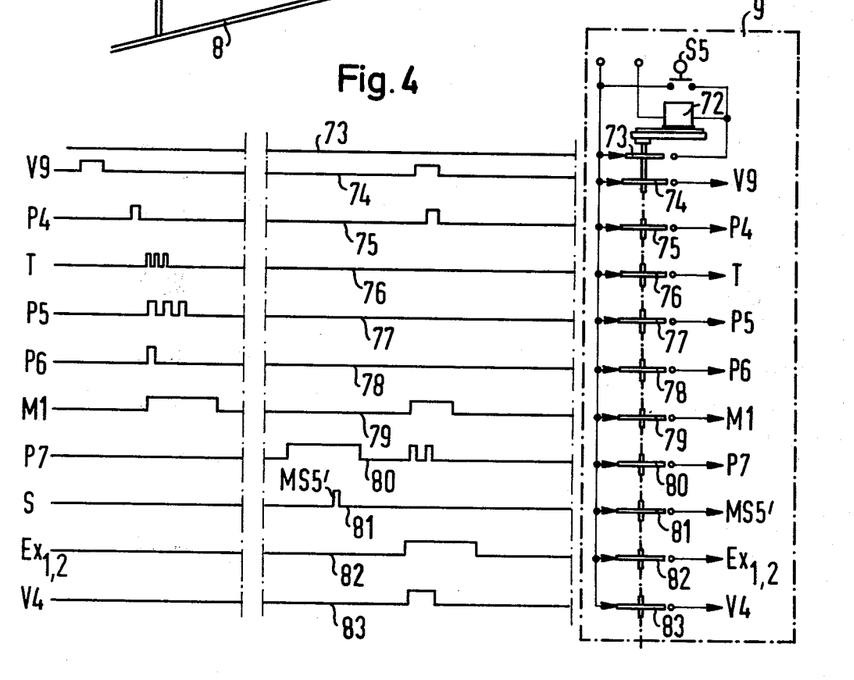
FIG. 4 is a schematic illustration of internal programmer control apparatus and the corresponding program developed by such apparatus.

As can be further seen from FIG. 4, by the activation of a switch S5' whose turn on is briefly accomplished by the analysis programmer 43 of the gold bath analysis device, a programmer 72 of the internal program control unit 9 is set into operation. Only a short starting pulse occurs. This pulse has the effect that when the motor 72 starts the program disc 73 bridges the switch S5' so that the motor 72 continues to run. Now, controlled by the program disc 74, the valve V9 opens, and it should be noted that in this context that the valve V1 is opened as a result of the program control mechanism 43 according to FIG. 2. This has a consequence that during a brief opening pulse the container 61 fills with liquid of the bath to be analyzed. Any excess fluid flowing into the container drains off by way of the overflow 62 and the line 8. After the brief opening pulse, the valve V9 closes in turn. Controlled by the program disc 75, the pump P4 now goes into operation and extracts a measured quantity of fluid from the container 61 and empties the same into the reaction container 64. The program disc 76 conveys several droplet metering pulses to the metering pump P. The pump P5 is also activated several times by the program disc 77 so that a sufficient quantity of dilution agent is fed into the fluid to be analyzed. The program disc 78 meters a proportion quantity of benzene for the analysis into the reaction mixture. The motor M1 is switched on by the program disc 79 and the mixture is briefly stirred. A settling period now takes place, whereby the individual components of the mixture precipitate.

At this time, controlled by the program disc 80, the pump P7 is activated. This provides that a measurement cuvette 85 of a colorimeter 86 connected in the intake line of the pump P7 fills with the fluid to be analyzed. The measurement cuvette 85 is located in the path of a measurement beam 87 of the colorimeter. A reference beam conducted through a reference filter 88 strikes a light-sensitive element 89, whereas, by contrast, the measuring beam strikes a light-sensitive element 90. The different voltages are measured at the measurement value outputs 91 and 91'.

The measuring value switch MS5 is closed in response to operation of the program disc 81 of the programmer 9. The measurement values are now present at the outputs 91 and 91' of the colorimeter. After the measurement is completed, the return stroke of the piston of the pump P7 takes place so that the measurement fluid is, in turn, expelled into the container 64. The outlet valves $Ex_1$ and $Ex_2$ are now opened under the control of the program disc 82 and all of the containers are emptied by way of the pipe line 8.

The valve V1 is closed by the bath analysis programmer 43, according to FIG. 2. The program disc 83 now opens the valve V4. The valve V9 also opens again. Distilled rinsing water now flows into the above-mentioned containers by way of the pipe line L7. The pump P7, controlled by the program disc 80, again receives two stroke pulses so that the measurement cuvette 85 of the colorimeter is rinsed, along with the appertaining pipe lines, Subsequent thereto, the outlet valves $Ex_1$ and $Ex_2$ are opened again, the rinsing water drains away, and the analysis section S5 is again ready for operation. The program disc 73 has run its course and now opens the holding circuit for the motor 72, which now automatically shuts off. The analysis program is completed.

The other analysis sections are also formed in a corresponding manner. Thus, for example, the analysis section S3 for determining the pH value of the gold bath, according to FIG. 5, also consists of a container 92 which has an overflow 93 and an outlet valve $Ex_3$. A pH measuring electrode 94 projects into the container 92. A stirring motor M2 for a stir 95 is mounted in the bottom of the container 92.

Figure 5:
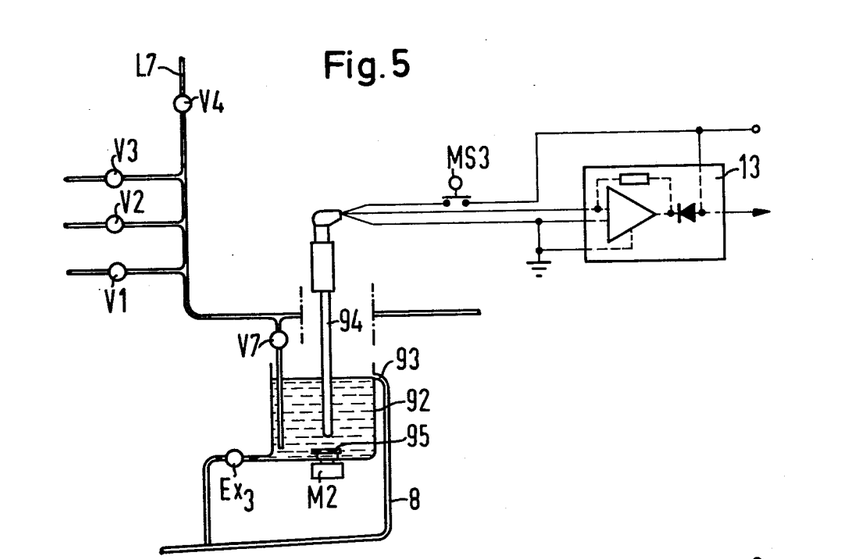
FIG. 5 is a schematic illustration of apparatus for determining the pH value of a gold bath.
Figure 6:
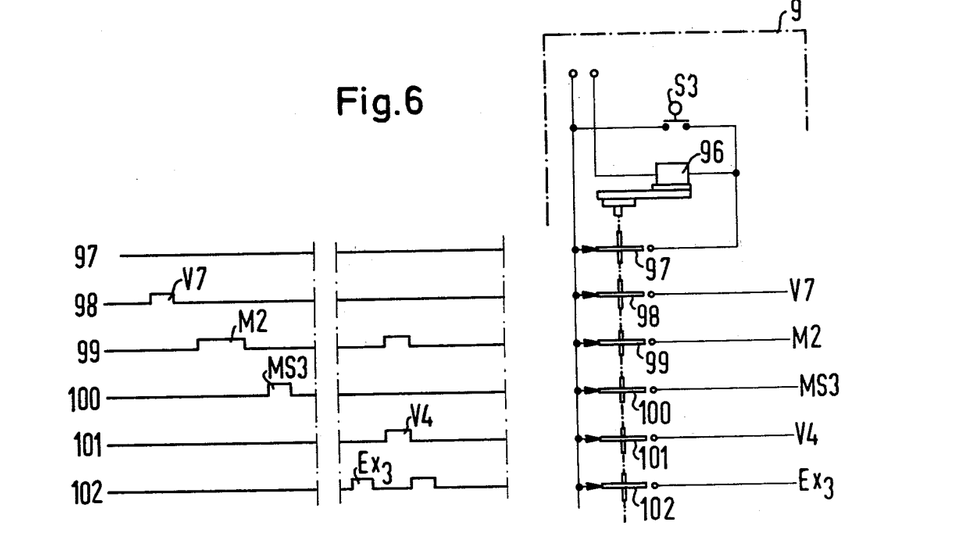
FIG. 6 illustrates a program circuit for use in conjunction with the apparatus of FIG. 5.

FIG. 6 illustrates the appertaining program circuit structure in the internal programmer 9 of the analysis unit 7. As soon as the program switch S3 is briefly closed by the analysis programmer 43 according to FIG. 2, the programmer motor 96 for the pH measurement section according to FIG. 5 is energized. The prgram disc 97 then closes the holding circuit for the motor 96 so that the latter performs the program. Shortly thereafter, the program disc 98 actuates the valve V7. The valve V1 had already been opened. Bath fluid now flows into the container 92. Excess bath fluid drains away via the overflow 93 and the outlet line 8. The program disc 99 briefly turns on the stirring mechanism M2, 95. The program disc 100 closes the measurement switch MS3 of FIG. 5 so that a measurement signal is present at the measurement value amplifier and comparator 13. After the measurement is completed, the outlet valve $Ex_3$, controlled by the program disc 102, opens and the container 92 drains.

The program disc 101 opens the valve V4, the valve V1 having already been previously closed by the analysis programmer according to FIG. 2. This now provides that, during the open time of the valve V4, distilled water flows into the container 92 by way of the line L7 and rinses the same. During the rinsing operation, the stir M2 is placed into operation. After rinsing is completed the outlet valve $Ex_3$ is opened. The container 92 again drains. A new measurement can now begin. The program disc 97 has run through and now turns off the programmer motor 96. With that last action, the measurement cycle is finished.

The remaining sections have a corresponding structure, as illustrated in FIGS. 3-6. The type of analysis units can, however, as previously described, vary quite considerably and is only determined by the type of baths to be monitored or, respectively, the components thereof to be monitored.

In the above examples, the control units illustrated are primarily cam-type switching mechanisms. It is understood that it is also possible, within the scope of the present invention, to issue the individual switching commands in a time-dependent manner by means of electronic circuits. However, since the controlling currents for operating the valves and other mechanisms for electronic switching elements are high, the use of drive assemblies (running gears) is often recommended.

The control process unit 31 of FIG. 2 is a process computer which is per se well known in the art, for example the "Siemens 310[" type or the "Intel 8008". Other larger process computers are also suitable. Process computers of this type include a main programmer, as well as auxiliary or secondary programmers which can be actuated thereby; one of these secondary programmers is programmed for the task of a bath selection programmer 36. The analysis programmers 43-45 cannot only be hooked up as external units, but also may be incorporated into the secondary programmers.

The measurement value adjusting devices 11-15 of FIG. 1, as well as the reference value generators 24 and 25 and, respectively, the measurement value translators (decoders) 26 and 27 are well known per se and are discussed, for example, in the book by George A. Philbrick Researches, Inc., Copyright 1966, Nimrod Press, Inc., Boston, Mass., at I 24 and II 41 exactly as described here in particular.

The program control logic includes a timer which stops the main program following the handling of an analysis program or a flushing program for a predeterminable length of time, so that the individual programs do not directly follow one another. The timer is also connected to an analysis program counter which counts the analyses which have been effected and, in fact, for each bath; and the number of bath analyses to be carried out for each bath during a shift of, for example, eight hours, can be set on the counter.

Although we have described our invention by reference to particular illustrative embodiments thereof, many changes and modifications of the invention may become apparent to those skilled in the art without departing from the spirit and scope of the invention. We therefore intend to include within the patent warranted hereon, all such changes and mdifications as may reasonably and properly be included within the scope of our contribution to the art.

We claim:

1. A process control system for monitoring the chemical composition of bath liquid for a plurality of baths, in particular metal depositing baths, said process control system comprising:
    a main programmer for operating the control system through a sequence of program steps;
    a bath selection programmer connected to said main programmer and to the baths for selecting baths for analysis;
    a chemical component analyzer including a plurality of constituent analyzing sections for anayzing respective quantities of respective bath constituents;
    a plurality of analysis programmers connected to said analyzer and connected to and operated by said bath selection programmer to connect selected baths to appropriate analyzer sections;
    a supply of bath correcting fluids;
    comparison means connected to said analyzer to compare the analyzed actual quantities with respective reference quantities; and
    adjusting means connected to said comparison means and connected between said supply and the plurality of baths for supplying correcting fluids to the respective baths in accordance with the differences between the actual and reference quantities.

2. The process control system of claim 1, wherein said bath selection programmer has a number of said analysis programmers operated thereby corresponding to the number of dissimilar baths which are to be monitored, said analysis programmers operable to connect the individual analyzing sections to the baths.

3. The process control system of claim 1, wherein each of the baths comprises a respective circulating pipe line and a respective blocking valve in the circulating pipe line connected to and operated by a respective analysis programmer.

4. The process control system of claim 1, wherein said chemical component analyzer includes common input and output pipe lines, and further comprising:
a supply of flushing liquid;
a flushing programmer connected to and operated by said bath selection programmer after each analysis to provide a flushing program; and
flushing means operated by said flushing programmer to provide flushing liquid to said chemical component analyzer and the common input and output pipe lines thereof.

5. The process control system of claim 1, comprising: reference value generators connected to said adjusting means and connected to and directly operated by said bath selection programmer.

6. The process control system of claim 1, comprising: actual value translators selectively connected by said bath selection programmer to said adjusting means.

7. The process control system of claim 1, comprising: a plurality of actual value registers each assigned to a respective bath, each of said registers selectively connected in response to the operation of said bath selection programmer to a respective adjusting means to record the measured value.

8. The process control system of claim 1, comprising: a central control unit which includes said main programmer, a data input distributor connected to said comparison means, said bath selection programmer connected to said main programmer and to said analysis programmers, a control logic including said comparison means, and a consumption and correcting computer which monitors the consumption of the various bath liquids.

9. The process control system of claim 1, wherein said comparison means of said control logic comprises, for each measured value, a comparator for comparing the measured value to a permissible limit value and is responsive to block said bath selection programmer when the measured value exceeds the permissible limit value at the completion of an analysis program.

10. The process control system of claim 9, comprising:
an alarm connected to said control logic and operated in response to a measured value exceeding its permissible limit value.

11. The process control system of claim 1, wherein said main programmer includes a program indicator.

12. The process control system of claim 1, wherein the plurality of baths comprises work-piece treatment baths followed by noble metal baths in the path of work-piece travel.

13. The process control system of claim 1, comprising:
means operable to block correcting liquid flow and simultaneously actuate said main programmer to run through the entire main program as an idle function check of system operation.

14. The process control system of claim 1, wherein each of said baths has a pump for circulating the liquid thereof and said analyzer comprises an internal control unit operating in a prescribed sequence, and said bath selection programmer initiates operation of said analyzer upon a predetermined time delay of about three minutes after switching on the relevant pumps.

* * * * *